(12) United States Patent
Akkar

(10) Patent No.: US 7,747,012 B2
(45) Date of Patent: Jun. 29, 2010

(54) PROCESS OF SECURITY OF AN ELECTRONIC UNIT WITH CRYPTOPROCESSOR

(75) Inventor: Mehdi-Laurent Akkar, Gentilly (FR)

(73) Assignee: Gemalto SA, Meudon (FR)

( * ) Notice: Subject to any disclaimer, the term of this patent is extended or adjusted under 35 U.S.C. 154(b) by 617 days.

(21) Appl. No.: 10/548,916

(22) PCT Filed: Mar. 12, 2004

(86) PCT No.: PCT/IB2004/000738

§ 371 (c)(1),
(2), (4) Date: Aug. 14, 2006

(87) PCT Pub. No.: WO2004/081769

PCT Pub. Date: Sep. 23, 2004

(65) Prior Publication Data

US 2006/0277239 A1    Dec. 7, 2006

(30) Foreign Application Priority Data

Mar. 14, 2003  (EP)  .................. 03290655

(51) Int. Cl.
*H04L 9/00* (2006.01)
*H04L 9/32* (2006.01)
*G06F 7/04* (2006.01)

(52) U.S. Cl. .................. 380/29; 726/27; 726/28; 726/29; 726/30

(58) Field of Classification Search .................. 380/29
See application file for complete search history.

(56) References Cited

FOREIGN PATENT DOCUMENTS

WO    WO 01/31422 A2 *  5/2001

* cited by examiner

*Primary Examiner*—Longbit Chai
(74) *Attorney, Agent, or Firm*—Pehr B. Jansson; The Jansson Firm

(57) ABSTRACT

The invention concerns a process for securing an electronic device incorporating a hardware component capable of autonomous implementation of calculation process f using one key K, the process involves calculating at least two new keys $K'^i$ such that at least one of said new keys is identical to key K, and one of said new keys is different from key K, and executing said calculation process f successively with each of said calculated keys $K'^i$, using said hardware component.

14 Claims, 2 Drawing Sheets

PROCESS OF SECURITY OF AN ELECTRONIC UNIT WITH CRYPTOPROCESSOR

The invention concerns a process for securing an electronic device incorporating a hardware component such as a cryptoprocessor, for the purpose of autonomous implementation of a cryptographic algorithm using a secret quantity such as a secret key. In more precise terms, the process is designed to secure said cryptoprocessor against a certain type of physical attacks referred to as Differential Power Analysis (first order electronic attacks or higher) which seek to obtain information concerning the secret key by studying the power consumption of the electronic device during execution of calculations.

FIELD OF THE INVENTION

Certain components incorporate a hardware DES algorithm. The DES algorithm has the advantage of being extremely fast—of the order of 20 microseconds—and can apparently withstand SPA and DFA type attacks. Unfortunately, it cannot withstand a first order DPA attack. Indeed, with a reasonable number of samples—of the order of 10,000—it is possible to extract the key. Faced with this vulnerability, it can be necessary to reprogram a secure software DES in full.

One purpose of this invention is to propose a process and system for securing components incorporating cryptoprocessors or equivalent devices, in particular against DPA type attacks.

The cryptographic algorithms considered here use a secret key to calculate output information according to input information. This can involve an encryption, decryption, signature or signature verification, authentication or non-repudiation operation. The algorithms are constructed in such a way that an attacker with knowledge of the inputs and outputs, cannot in practice deduce any information concerning the secret key itself. Numerous applications base their security on secret key cryptographic algorithms such as the DES, or the more recent AES algorithm, which has now taken its place as the worldwide encryption standard (see John Daemen, Vincent Rijmen; AES proposal; Rijndael; http://csrc.nist.gov/encryption/aes/rijndael/Rijndael.pdf).

We are interested in a broader class than that traditionally designated by the expression secret key algorithm or symmetrical algorithm. In particular, all that is described in this patent application also applies to the so-called public key or asymmetrical algorithms, which in fact incorporate two keys, one public and the other private and not disclosed, the latter being the target for the attacks described below.

The Power Analysis type attacks described by Paul Kocher and Cryptography Research (see document "Introduction to Differential Power Analysis and Related Attacks" by Paul Kocher, Joshua Jaffe and Benjamin Jun, Cryptography Research, 870 Market St., Suite 1008, San Francisco, Calif. 94102, HTML version of the document accessible at URL address: http://www.cryptography.com/dpa/technical/index.html, mentioned in this application for reference purposes) are based on the observation that, in reality, the attacker can acquire information other than simple input and output data, on execution of calculations, such as the power consumption of the microcontroller or the electromagnetic radiation emitted by the circuit, for example. This information, which depends on secret quantities such as the key, leaks from the card.

Differential Power Analysis, abbreviated to DPA, is an attack which makes it possible to obtain information concerning the secret key contained in the electronic device, by making a statistical analysis of records of power consumption for a large number of calculations with the same key.

We can consider, as a non-exhaustive example, the case of the DES (Data Encryption Standard) algorithm, a description of which can be found in any of the following documents:

FIPS PUB 46-2, Data Encryption Standard, 1994;

FIPS PUB 74, Guidelines for Implementing and Using the NBS Data Encryption Standard, 1981;

ANSI X3.92, American National Standard, Data Encryption Algorithm, 1981;

ISO/IEC 8731:1987, Banking—Approved Algorithms for Message Authentication—Part 1: Data Encryption Algorithm (DEA).

Or in the following work:

Bruce Schneier, Applied Cryptography, 2nd edition, John Wiley & Sons, 1996, page 270.

The above-mentioned documents are indicated in this application for reference purposes.

The DES algorithm is executed in 16 steps referred to as rounds (see FIG. 1a). In each of these 16 rounds, conversion F is executed on 32 bits. This conversion F uses eight 6-bit to 4-bit non-linear conversions, each coded in a table referred to as an S-box (see FIG. 1b), where the S-boxes are noted S1, S2, ..., S8.

A DPA attack on the DES algorithm can be implemented as follows:

1st step: Consumption is measured on the first round for 1,000 DES calculations. The input values for these 1,000 calculations are noted E[1], ..., E[1000]. The 1,000 curves corresponding to power consumption measured for these calculations are noted C[1], ..., C[1,000]. Mean curve CM is also calculated for the 1,000 consumption curves.

2nd step: We consider the first output bit from the first S-box on the first round, for example. The value of this bit is noted b. It is easy to see that b only depends on 6 bits of the secret key. The attacker makes an assumption concerning the 6 bits concerned. The attacker calculates the theoretical values expected for b from these 6 bits and the E[i]. This makes it possible to separate the 1,000 inputs E[1], ..., E[1,000] into two categories: those which give b=0, and those which give b=1.

3rd step: Mean value CM' is then calculated for the curves corresponding to the first category inputs, namely those for which b=0. If CM and CM' show a marked difference, it is considered that the values adopted for the 6 bits of the key were correct. If CM and CM' do not show a marked difference in the statistical sense, namely no difference substantially greater than the typical variance for the noise measured, the 2nd step is repeated with a different selection for the 6 bits.

4th step: Steps 2 and 3 are repeated with a target bit b from the second S-box, and then from the third S-box, and so on up to the eighth S-box. Forty-eight bits of the secret key are finally obtained in this way.

5th step: The 8 remaining bits can be found by exhaustive search.

This attack requires no knowledge concerning the individual power consumption of each instruction, nor the position in time of each of these instructions. It applies in the same way if we assume that the attacker knows the outputs of the algorithm and corresponding consumption curves. It is based solely on the following fundamental assumption:

Fundamental assumption: An intermediate variable exists, appearing during the course of calculation of the algorithm, such that knowledge of a few key bits, in practice less than 32 bits, is sufficient to decide whether two inputs, respectively two outputs, give the same value for this variable or not.

All algorithms using the S-box principle, such as the DES algorithm, are potentially vulnerable to DPA attack, as the customary methods of implementation generally lie within the framework of the assumption mentioned above.

So-called High-Order Differential Power Analysis attacks, abbreviated to HO-DPA, correspond to generalisation of the DPA type attack described above. They can use a number of different information sources apart from consumption, and can involve measurement of electromagnetic radiation, temperature, etc., and employ more sophisticated statistical processing than the simple notion of average, with less elementary intermediate variables (generalising bit b defined above). Nevertheless, they are based on precisely the same fundamental assumption as the DPA attack.

SUMMARY OF THE INVENTION

The invention concerns a process for securing an electronic device incorporating a hardware component capable of autonomous implementation of a calculation process using key K, characterised by the fact that it involves calculating at least two new keys $K'^i$ such that for at least one given i=j, $K'^j$=K and for at least one i=t, $K'^t$< >K, and executing said calculation process with each of said calculated keys $K'^i$ in succession, using said hardware component.

According to one particular form of implementation, the process involves calculating I=α m new keys $K'^1, \ldots, K'^I$, so that for a given j (0<j<n+1), sub-keys $K''j$ (0<l+1) take all the possible values, including the value of sub-key Kj, and executing hardware cryptographic function f with these I new keys $K'^1, \ldots, K'^I$, in a random manner.

The invention also concerns an electronic device and a smart card for example, and a program for implementation of the process.

BRIEF DESCRIPTION OF THE DRAWINGS

Other purposes, advantages and characteristics of the invention will emerge from the following description of implementation of the process according to the invention, and of a method of execution of an electronic device adapted for this implementation, given for non-exhaustive example purposes referring to the appended drawings where.

DESCRIPTION OF THE INVENTION

The process according to the invention is designed to secure an electronic device, for example an on-board system such as a smart card implementing a cryptographic calculation process which uses a secret key. The electronic device incorporates means to process information, such as a processor, and means to store information such as a memory.

Figure 1:
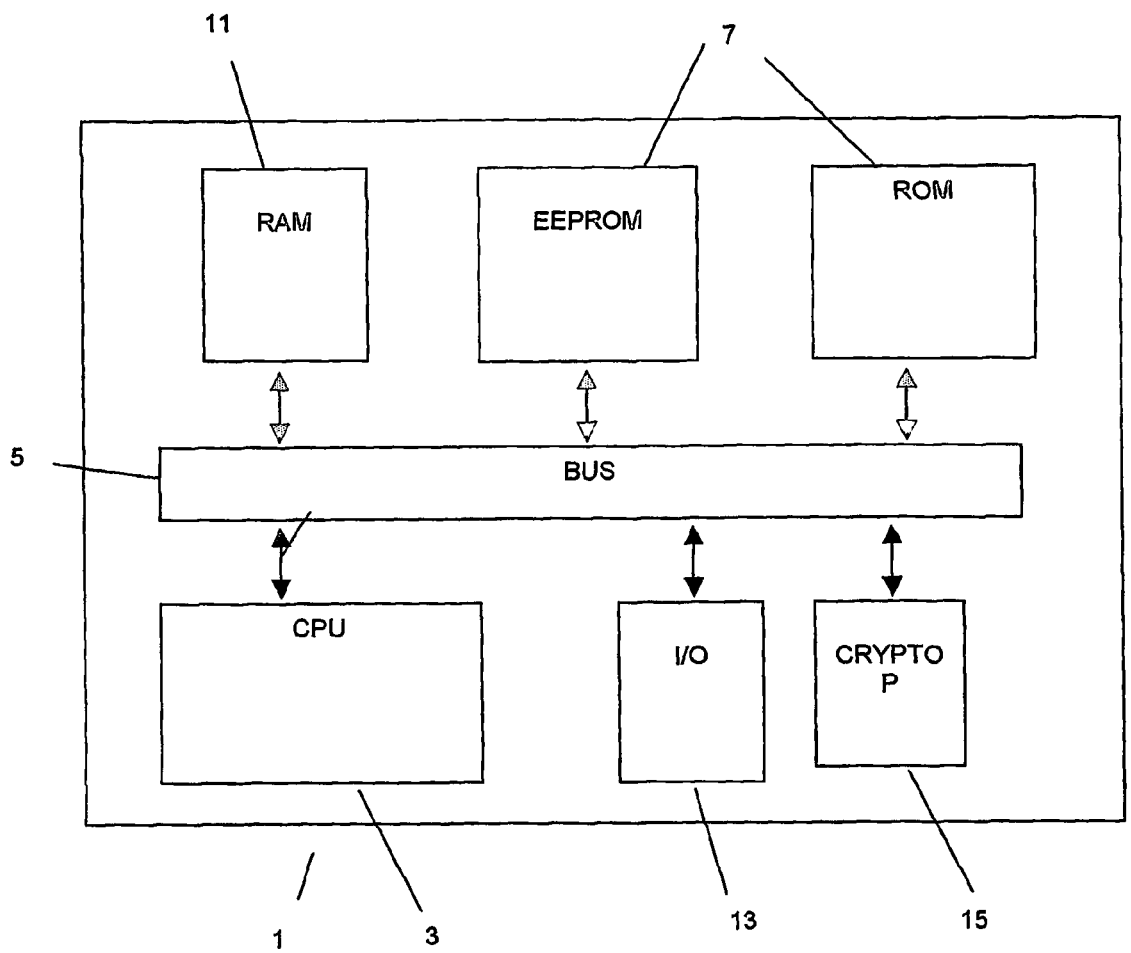
FIG. 1 shows an electronic device according to the invention in schematic form.

As a non-exhaustive example, the electronic device described below corresponds to an on-board system incorporating electronic module 1 as shown in FIG. 1. Modules of this type usually take the form of a monolithic integrated electronic microcircuit or chip, which, once protected physically by any known means, can be mounted on a portable object such as a smart card, microcircuit card or other which can be used in various domains, for example.

Figure 2:
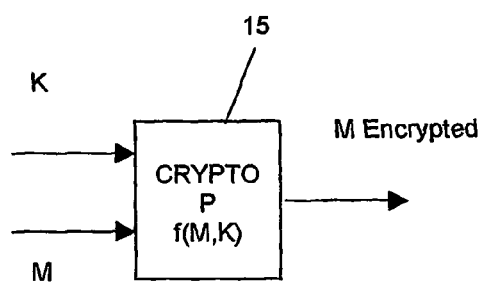
FIG. 2 shows a hardware component of said device according to FIG. 1 in schematic form.

Microprocessor electronic module 1 comprises CPU microprocessor 3, connected bidirectionally via internal bus 5 to a non-volatile memory 7 of the ROM, EEPROM, Flash, FeRam or other type containing an executable program, RAM memory 11, I/O device 13 for communication with the exterior, and cryptoprocessor calculation unit 15 (CRYPTO P), this component being capable of autonomous cryptographic calculation, such as calculation of a DES algorithm, for example. As shown in FIG. 2, cryptoprocessor 15 of said module 1 executes calculation process f using secret key K, stored in a secret zone of a memory, for example of the EEPROM type, on a message M.

Figure 3:
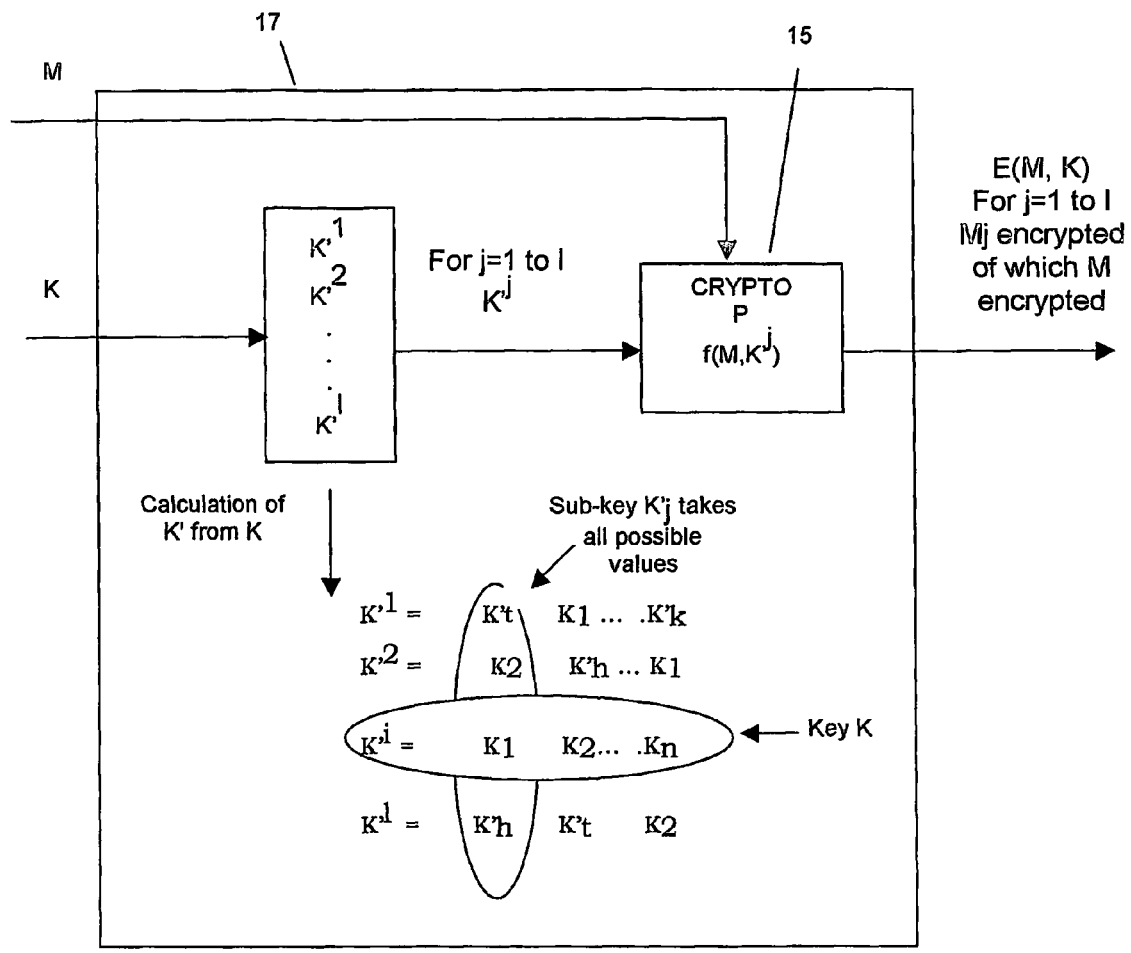
FIG. 3 shows the process according to the invention in schematic form.

We will firstly consider the solution in its general form. As shown in FIG. 3, the objective is to calculate result E(M,K) of cryptographic function E on message M, using key K. For this purpose, we have function f, which, in its capacity as a black box, executes the same calculation as E but cannot withstand DPA attack in particular. We also consider that key K acts in regard to the algorithm in the form of n small sub-keys mb (taking mb<10 bits, or $m=2^{mb}$ possible values for each sub-key), which will then be noted K1, K2, . . . , Kn, and which will be susceptible to DPA attack in particular. The sub-keys are of the same size in the form of implementation described below. The invention also applies for sub-keys of a different size.

The invention involves associating external software module 17 with the cryptoprocessor, to secure the cryptographic function implemented by said cryptoprocessor 15.

As shown in FIG. 3, the invention involves calculating I=α m new keys $K'^1, \ldots, K'^I$, so that for a given j (0<j<n+1), each sub-key $K''j$ (0<i<l+1) takes all the possible values, and according to a special form of implementation α times, including the value of sub-key Kj, and executing hardware cryptographic function f with these I new keys $K'^1, \ldots, K'^I$ in a random manner.

In other words, the idea is to execute I=α m successive calculations with keys $K'^i$, 0≤i<1, such that:

there exists i such that $K'^i$=K.

For all the j, we have $\{K'^i j, 0 \leq i < n\} = \{0, 1, \ldots, n-1\}$, with each sub-key appearing exactly α times.

This means in fact that we will execute a number of successive calculations with different keys (including the true key), in such a way that each possible sub-key appears the same number of times. The calculations will also be executed in a random order. Consequently, the attacker has no chance of identifying the correct sub-key by DPA attack, as this sub-key appears neither more nor less frequently than any other.

We will now see how this countermeasure (noted CM in the following paragraphs) applies to different algorithms.

Simple Application to the DES Algorithm

Notations

We will adopt the following notations for the DES algorithm:

PC1 represents the initial permutation of the key, reducing the key from 64 to 56 bits.

IPC1 represents the inverse of PC1 (56 bits to 64), where the 8 missing bits are completed (parity bits are frequently used).

PC2 represents the combination of compressive permutation (56 bits to 48 bits) and shift of the key to the first round.

IPC2 represents the inverse of PC2 (48 to 56 bits), where the 8 undetermined bits (8=56–48) are selected arbitrarily (for example randomly).

The permutation from 48 bits to 64 bits (combination of IPC2 and IPC1) is noted PP.

We see that PP makes it possible, starting from key K48 with 48 bits, used in the first round of the DES algorithm, to reach global key K64=PP(K48) having the following property: using K64 as the key for a DES calculation, we obtain K48 as the first sub-key in the first round.

We will now see how we can apply our countermeasure in concrete terms.

1.1 Initial Implementation of the CM

In the case of the DES algorithm, the sub-keys are used in the form of n=8 sub-keys of mb=6 bits each, giving m=64 possibilities. We shall then execute 64 successive calculations ($\alpha=1$) with the following derivative keys:

```
K00 = K ⊕ PP( 000000 | 000000 | ... | 000000 | 000000 )
K01 = K ⊕ PP( 000001 | 000001 | ... | 000001 | 000001 )
K02 = K ⊕ PP( 000010 | 000010 | ... | 000010 | 000010 )
K03 = K ⊕ PP( 000011 | 000011 | ... | 000011 | 000011 )
.
.
.
K61 = K ⊕ PP( 111101 | 111101 | ... | 111101 | 111101 )
K62 = K ⊕ PP( 111110 | 111110 | ... | 111110 | 111110 )
K63 = K ⊕ PP( 111111 | 111111 | ... | 111111 | 111111 )
```

It is thus easy to see that for each of the eight sub-keys used in the first round, the 64 possible values are represented equally, and that true key K00 is present in the list. It is then merely necessary to execute 64 DES calculations with the 64 derivative keys in a random order, and select the final result as being that where the correct key has been used.

This can be done in the following way. Sixteen memory bytes are allocated to store the result. An additional byte is also allocated for each Ki (initialised in this case at 0 or 8), which will indicate the byte from which the result is stored in memory. Thus, this byte will take the value 8 for all keys except K00 for which it will take the value 0. This makes it possible to use a relatively generic code, which could resemble the next pseudo-code C, considering that we have one function executing a memory copy, one which calculates the PP(i| ... |i) and one which randomizes the 64 keys.

```
void
    DES_encrypt_DPA( unsigned char in[8],
                     unsigned char cle[8],
                     unsigned char out[8] )
{
    int i;
    unsigned char M1[8], M2[16], K[64][9];
    memcopy(K[0],cle,8);
    K[0][8] = 0;
    for(i=1; i<64; i++)
    {
        memcopy(K[i], cle XOR PP(i | ... | i), 8);
        K[i][8] = 8;
    }
    randomize_0_63(K);
    for(i=0; i<64; i++)
    {
        memcopy(M1, in, 8);
        DES_encrypt_non_DPA(M1,K[i]);
        for(j=0;j<8;j++)
        {
            M2[K[i][8] + j] = M1[j];
        }
    }
    memcopy(out, M2, 8);
}
```

1.2 General Security Considerations

From the DPA point of view, it is easy to see that any attacker, unable to distinguish for each of the 64 executions of the DES algorithm whether the true key is concerned or not, cannot attack the algorithm with a conventional DPA. However, it must be remembered that programming of the method requires a very strict approach, as any analysis making it possible to distinguish—even rarely—the correct key destroys the CM completely! Attention must therefore be paid to the following critical points:

Randomization: this step shifts the true key to location $0 \leq i < 64$ which must be unknown to the exterior.

Result copy (loop to j): here again, the two values (0 or 8), which would enable the attacker, if revealed, to know which DES algorithm uses the true key, are involved.

3.4 CM Extensions and Various Aspects

If we take a closer look at function PP, it is easy to see that it is not necessary to use the same value for the eight sub-keys, as was done previously, to mask the key. Taking sub-key i, it is merely necessary for the 64 possible values to appear. It is not necessary for the order of the 64 values to be the same for a given sub-key as for another sub-key! The only requirement is that the value 0 of the sub-key (for which the true sub-key is used) appears at the same time for the eight sub-keys, so that one of the 64 calculations gives the correct result. We can thus imagine a derivation of the following type:

```
K00 = K ⊕ PP( 000000 | 000000 | ... | 000000 | 000000 )
K01 = K ⊕ PP( 011000 | 001101 | ... | 001001 | 111100 )
K02 = K ⊕ PP( 010101 | 001111 | ... | 001011 | 010000 )
K03 = K ⊕ PP( 110011 | 100010 | ... | 000011 | 010010 )
K61 = K ⊕ PP( 101011 | 011100 | ... | 110001 | 101000 )
K62 = K ⊕ PP( 100111 | 101010 | ... | 000110 | 010111 )
K63 = K ⊕ PP( 001110 | 010111 | ... | 011100 | 110001 )
```

This merely requires a function which executes a random permutation of the values [1,63].

It should be noted that the fact that the mask (000000 | ... |000000) always appears in the initial position does not represent a problem, as the derivative keys are then permutated randomly before being used. If we consider that we have a function PP2(i,val) which replaces the 6 bits of value val in the correct position for it to correspond to sub-key i, we then obtain the following pseudo-code C:

```
void
    DES_encrypt_DPA(unsigned char in[8],
                    unsigned char cle[8],
                    unsigned char out[8] )
{
    int i,j;
    unsigned char M1[8], M2[16], K[64][9];
    memcopy(K[0],cle,8);
    K[0][8] = 0;
    for(i=0;i<64;i++)
    {
        memcopy(K[i],cle,8);
    }
    for(i=0; i<8; i++)
    {
        unsigned char Perm63[63];
        randomize_1_63(Perm63);
        for(j=1; j<64; j++)
        {
            K[j] = K[j] XOR PP2(i,Perm[j]);
        }
```

-continued

```
    }
    randomize_0_63(K);
    for(i=0; i<64; i++)
    {
        memcopy(M1, in, 8);
        DES_encrypt_non_DPA(M1,K[i]);
        for(j=0;j<8;j++)
        {
            M2[K[i][8] + j] = M1[j];
        }
    }
    memcopy(out, M2, 8);
}
```

Randomization of the 64 derivative keys can be performed using the following conventional method (cf. Crypto '2002 or Akkar/Goubin article on HODPA attacks on the DES algorithm), which involves scanning the keys from 0 to 63 with index i, and exchanging the key with index i with a key with an index selected randomly between 0 and 63:

```
void
randomize(unsigned char table[64])
{
    int i, i_temp;
    unsigned char temp;
    for(i=0; i<64; i++)
    {
        table[i] = i;
    }
    for(i=0; i<64; i++)
    {
        i_temp = random( ) % 64;
        temp = table[i];
        table[i] = table[i_temp];
        table[i_temp] = temp;
    }
}
```

3.5 Other DES Rounds

We have seen how to protect the first DES round against DPA attack. Where the DES is more vulnerable on the 16th round in the protocol used, a similar method can naturally be envisaged. Only function PP will change, and correspond to the key-scheduling for the 16th round! It is then possible to use 64 key masks which protect both the first and last rounds. The following 64 key mask keys possess this property:

Obviously, this countermeasure (or at least the critical parts) must be implemented in the assembler mode, so as to avoid introducing vulnerability due to unfamiliarity with the methods used by the compiler.

2. Application to the AES Algorithm

Obviously, this method can apply in a similar way to the AES algorithm. This is even simpler to explain, as the first sub-key used—which is frequently the target—comprises the key with no other conversion. Another practical difference stems from the fact that the key occurs 8 bits by 8 bits. Thus, in the case of an AES algorithm with key and 128-bit message, we obtain key derivation and a pseudo-code C as follows:

$K_{00} = K \oplus ( 00000000 \mid 00000000 \mid \ldots \mid 00000000 \mid 00000000 )$
$K_{01} = K \oplus ( 00000001 \mid 00000001 \mid \ldots \mid 00000001 \mid 00000001 )$
$K_{02} = K \oplus ( 00000010 \mid 00000010 \mid \ldots \mid 00000010 \mid 00000010 )$
$K_{03} = K \oplus ( 00000011 \mid 00000011 \mid \ldots \mid 00000011 \mid 00000011 )$
.
.
.
$K_{61} = K \oplus ( 11111101 \mid 11111101 \mid \ldots \mid 11111101 \mid 11111101 )$
$K_{62} = K \oplus ( 11111110 \mid 11111110 \mid \ldots \mid 11111110 \mid 11111110 )$
$K_{63} = K \oplus ( 11111111 \mid 11111111 \mid \ldots \mid 11111111 \mid 11111111 )$

```
    void
    AES_encrypt_DPA( unsigned char in[16],
                     unsigned char cle[16],
                     unsigned char out[16] )
    {
        int i;
        unsigned char M1[16], M2[32], K[256][17];
        memcopy(K[0],cle,16);
        K[0][16] = 0;
        for(i=1; i<256; i++)
        {
            memcopy(K[i], cle XOR (i | ... | i), 16);
            K[i][8] = 16;
        }
        randomize_0_255(K);
        for(i=0; i<256; i++)
        {
            memcopy(M1, in, 16);
            AES_encrypt_non_DPA(M1,K[i]);
            for(j=0;j<16;j++)
            {
                M2[K[i][16] + j] = M1[j];
            }
        }
        memcopy(out, M2, 16);
    }
```

| | | | |
|---|---|---|---|
| 0000000000000000 | 8444054405410000 | 410900B100033003 | C54D05F505423003 |
| 0093420342004141 | 84D7474747414141 | 419A42B242037142 | C5DE47F647427142 |
| 0021000000950C9C | 8465054405D40C9C | 412800B100963C9F | C56C05F505D73C9F |
| 00B2420342954DDD | 84F6474747D44DDD | 41BB42B242967DDE | C5FF47F647D77DDE |
| 2200300918288100 | A644354D1D698100 | 630930B8182BB103 | E74D35FC1D6AB103 |
| 2293720A5A28C041 | A6D7774E5F69C041 | 639A72BB5A2BF042 | E7DE77FF5F6AF042 |
| 2221300918BD8D9C | A665354D1DFC8D9C | 632830B818BEBD9F | E76C35FC1DFFBD9F |
| 22B2720A5ABDCCDD | A6F6774E5FFCCCDD | 63BB72BB5ABEFCDE | E7FF77FF5FFFFCDE |
| 18008800A0000321 | 9C448D44A5410321 | 590988B1A0033322 | DD4D8DF5A5423322 |
| 1893CA03E2004260 | 9CD7CF47E7414260 | 599ACAB2E2037263 | DDDECFF6E7427263 |
| 18218800A0950FBD | 9C658D44A5D40FBD | 592888B1A0963FBE | DD6C8DF5A5D73FBE |
| 18B2CA03E2954EFC | 9CF6CF47E7D44EFC | 59BBCAB2E2967EFF | DDFFCFF6E7D77EFF |
| 3A00B809B8288221 | BE44BD4DBD698221 | 7B09B8B8B82BB222 | FF4DBDFCBD6AB222 |
| 3A93FA0AFA28C360 | BED7FF4EFF69C360 | 7B9AFABBFA2BF363 | FFDEFFFFF6AF363 |
| 3A21B809B8BD8EBD | BE65BD4DBDFC8EBD | 7B28B8B8B8BEBEBE | FF6CBDFCBDFFBEBE |
| 3AB2FA0AFABDCFFC | BEF6FF4EFFFCCFFC | 7BBBFABBFABEFFFF | FFFFFFFFFFFFFFFF |

The only real difference is that key-scheduling for the AES algorithm is not linear, in contrast to the DES, except for the first sub-key. Thus, if we wish to protect the last round by this method, a method similar to the DES cannot be considered. It is then necessary to store the set of 256 keys specific to a given key, instead of the key derivation plan.

3. Conclusion

We thus see that it is possible, by execution of 64 DES (or 256 AES) algorithms and a number of ancillary calculations, to protect a cryptographic algorithm (DES or AES, for example) against DPA attack by means of a rapid although unprotected brick. Sixty-four DES or 256 AES may appear long, nevertheless in practice these hardware operations take a practically negligible amount of time.

Although specific embodiments of the invention have been described and illustrated, the invention is not to be limited to the specific forms or arrangements of parts so descried and illustrated. The invention is limited only by the claims.

The invention claimed is:

1. A process for securing an electronic device incorporating a hardware component capable of autonomous implementation of calculation process f using key K, comprising:
   configuring at least one processor to perform the functions of:
   calculating at least two new keys $K'^i$, i is a positive integer, such that at least one of said new keys is identical to said key K, and at least one of said new keys is different from said key K;
   executing said calculation process f successively with each of said calculated keys $K'^i$ using said hardware component thereby producing a result corresponding to each calculated key $K'^i$; and
   returning as an output of the process only the result corresponding to the calculated key $K'^i$ that is identical to said key K.

2. The process according to claim 1, wherein said calculation process is executed with said keys $K'^i$ in a random order.

3. The process according to claim 1 or 2, wherein key K is sub-divided into sub-keys $K_1, \ldots, K_n$, and that the procedure involves calculating I=α m new keys $K'^1, \ldots, K'^I$, where m represents the number of possible values for one of sub-keys $K'^i j$ of $K'^i$, in such a way that for a given j (0<j<n+1), sub-keys $K'^i j$ (0<i<I+1) take all the possible values, including the value of sub-key Kj of K and wherein α is a positive integer thereby ensuring that I is a multiple of m.

4. The process according to claim 3, wherein sub-keys $K'^i j$ (0<i<I+1) take all the possible values α times.

5. The process according to claim 1 or 2, wherein key K is sub-divided into sub-keys $K_1, \ldots, K_n$, and that there exists at least one i such that key $K'^i$ is different from K for at least one sub-key $K'^i j$.

6. The process according to claim 5, wherein key K is sub-divided into sub-keys $K_1, \ldots, K_n$, and that the procedure involves calculating I=α m new keys $K'^1, \ldots, K'^I$, where m represents the number of possible values for one of sub-keys $K'^i j$ of $K'^i$, in such a way that for a given j (0<j<n+1), sub-keys $K'^i j$ (0<i<I+1) take all the possible values, including the value of sub-key Kj of K and wherein α is a positive integer thereby ensuring that I is a multiple of m.

7. The process according to claim 6 wherein sub-keys $K'^i j$ (0<i<I+1) take all the possible values α times.

8. An electronic device incorporating means to store a calculation process, means to execute said process by a processor and capable of autonomous implementation of a calculation process using key K, comprising:
   a software module, in conjunction with a hardware component, is implemented to:
   calculate at least two new keys $K'^i$, i is a positive integer, such that at least one of new said keys is identical to said key K, and one of said new keys is different from said key K,
   transmit in succession to said hardware component, the new keys calculated to implement said calculation process with each of said new keys $K'^i$,
   produce a result corresponding to each calculated key $K'^i$; and
   return as an output of the process only the result corresponding to the calculated key $K'^i$ that is identical to said key K.

9. An electronic device according to claim 8, wherein said software module transmits in succession the new keys calculated in a random order.

10. A computer storage medium storing computer program instructions executed upon access by a processor on an electronic device to perform the functions of a calculation process f using key K comprising:
    calculating at least two new keys $K'^i$, i is a positive integer, such that at least one of said new keys is identical to said key K, and at least one of said new keys is different from said key K;
    executing said calculation process f successively with each of said calculated keys $K'^i$ using a hardware component thereby producing a result corresponding to each calculated key $K'_i$; and
    returning as an output of the process only the result corresponding to the calculated key $K'^i$ that is identical to said key K.

11. The computer storage medium of claim 10, wherein said calculation process is executed with said keys $K'^i$ in a random order.

12. The computer storage medium of claim 10 or 11 wherein key K is sub-divided into sub-keys $K_1, \ldots, K_n$, and that there exists at least one i such that key $K'^i$ is different from K for at least one sub-key $K'^i j$.

13. The computer storage medium of claim 10 or 12 wherein key K is sub-divided into sub-keys $K_1, \ldots, K_n$, and that the procedure involves calculating I=α m new keys $K'^1, \ldots, K'^I$, where m represents the number of possible values for one of sub-keys $K'^i j$ of $K'^i$, in such a way that for a given j (0<j<n+1), sub-keys $K'^i j$ (0<i<I+1) take all the possible values, including the value of sub-key Kj of K and wherein α is a positive integer thereby ensuring that I is a multiple of m.

14. The computer storage medium of claim 13 wherein sub-keys $K'^i j$ (0<i<I+1) take all the possible values α times.

* * * * *